United States Patent [19]
Nipken

[11] 3,807,271
[45] Apr. 30, 1974

[54] MOUTHPIECE FOR WIND INSTRUMENTS

[76] Inventor: Rudolf Nipken, Friedorfer Str. 242, Bonn-Bad Godesberg, Germany

[22] Filed: Mar. 19, 1973

[21] Appl. No.: 342,809

[30] Foreign Application Priority Data
Mar. 21, 1972 Germany........................ 2213555

[52] U.S. Cl. ................................. 84/399
[51] Int. Cl. .............................. G10d 9/02
[58] Field of Search.................... 84/398, 399

[56] References Cited
UNITED STATES PATENTS
| | | | |
|---|---|---|---|
| 3,370,500 | 2/1968 | Zwolak | 84/398 |
| 1,556,729 | 10/1925 | Smith | 84/399 |
| 2,062,792 | 12/1936 | Limina | 84/399 |

FOREIGN PATENTS OR APPLICATIONS
| | | | |
|---|---|---|---|
| 24,526 | 3/1908 | Great Britain | 84/399 |

Primary Examiner—Lawrence R. Franklin
Attorney, Agent, or Firm—Michael S. Striker

[57] ABSTRACT

A mouthpiece for wind instruments has an elongated tubular composite body member with an end adapted to be pressed against the lips of a user. The inner surface of the body member near this end diverges in a direction away from the end. A first tubular insert member is removably received in the body member and is spaced from the end. A second annular insert member is interposed between the first member and the end and is centered by the first member. The second member has a complementary surface which sealingly abuts the diverging inner surface of the body member.

16 Claims, 7 Drawing Figures

MOUTHPIECE FOR WIND INSTRUMENTS

BACKGROUND OF THE INVENTION

The invention relates generally to wind instruments such as, for example, trumpets, horns, trombones and the like, which latter belong to the class of brass wind instruments. More particularly, the invention relates to the mouthpieces for wind instruments. The mouthpieces of special interest are those of the type within which there are to be found two adjacent inserts which abut each other and are removable so as to permit one or both of these to be replaced. Each insert is provided with a passage which communicates with the passage of the adjacent insert, the continuous passage thus formed communicating, in turn, with the passage in the body of the mouthpiece on one side and with the open end of the mouthpiece, i.e., the end which is pressed against the lips of a user, on the other side.

Experience with the known mouthpieces has shown the extreme importance of a precise mutual alignment or centering of the abutting inserts as well as of a smooth transition between the respective passages thereof, i.e., a smooth transition between the walls defining the respective passages. In addition, it is important to eliminate air gaps between the abutting surfaces of the inserts since such air gaps tend to promote corrosion. Furthermore, the inherent quality of the mouthpiece may be adversely affected by the presence of air gaps between the abutting surfaces of the inserts and by an irregular or discontinuous transition between the passages of the inserts. Thus, the inserts must be positioned in the mouthpiece with extreme accuracy. Aside from this, the mouthpieces themselves are required to be very versatile. However, it is desirable for the inserts to be easily removable and interchangeable in spite of the stringent requirements concerning the precision and versatility of the mouthpieces.

SUMMARY OF THE INVENTION

It is, accordingly, an object of the invention to provide a disassemblable and versatile mouthpiece for wind instruments which can be assembled and reassembled with a high degree of accuracy and the inserts of which are easily interchangeable.

Another object of the invention is to provide a mouthpiece for wind instruments wherein the inserts are always precisely aligned and centered relative to one another.

A further object of the invention is to provide a mouthpiece for wind instruments wherein the inserts are always precisely aligned and centered relative to one another and relative to the body of the mouthpiece.

An additional object of the invention is to provide a mouthpiece for wind instruments wherein the surfaces of walls defining the respective passages of the inserts merge smoothly into one another.

It is also an object of the invention to provide a mouthpiece for wind instruments wherein no air gaps exist between the abutting surfaces of the inserts and between the abutting surfaces of the mouthpiece body and the inserts.

Yet another object of the invention is to provide a mouthpiece for wind instruments wherein the inserts are located closer to that end of the mouthpiece which is placed between the lips of a user than was possible heretofore while still being firmly held in position.

A supplementary object of the invention is to provide a mouthpiece for wind instruments having inserts which may be assembled as a unit prior to insertion therein and which may be readily disassembled.

In order to attain these and other objects, the invention provides a mouthpiece for wind instruments which comprises an elongated substantially tubular body member having an end adapted to be pressed against the lips of a user. The body member includes an inner surface in the region of this end which diverges in a direction away from the end. A first substantially tubular insert member is accommodated in the body member and is spaced from the aforementioned end. A second substantially annular insert member is interposed between the first insert member and this end. The second insert member is centered by the first insert member. Also, the second member includes a complementary surface which sealingly abuts the aforementioned inner surface of the body member.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
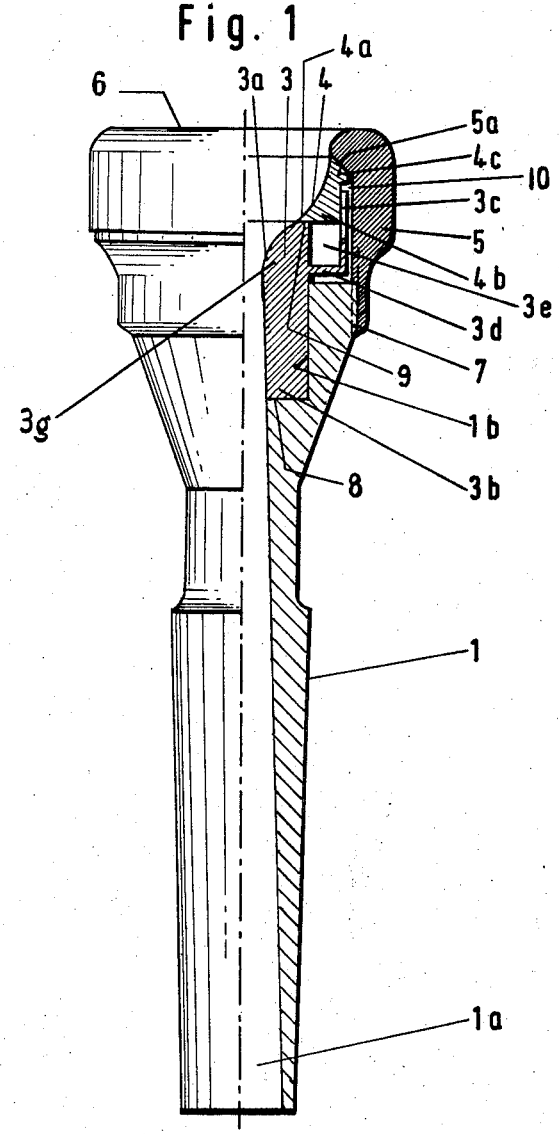
FIG. 1 is a partly side elevational and partly axial sectional view of one form of a mouthpiece according to the invention.

The mouthpiece of FIG. 1 includes an elongated substantially tubular composite main body or body member 1,5 having an external end 6 which, in use, is pressed against the lips of a user. The body 1,5 also has an opposite end which is adapted to be connected with a brass wind instrument. The term "composite" is here taken to mean a body consisting of at least two sections which are either movable relative to one another or which may be completely disengaged from one another. The body section or shank 1 of the body 1,5 is provided with a central or first passage 1a extending along the elongation of the body 1,5. The passage 1a extends through the end of the body 1,5 which is adapted to be connected with the wind instrument and permits vibrations from the lips of a user to pass into the instrument. The passage 1a is conical, that is, starting from the plane indicated at 8, the passage 1a widens continuously with increasing distance from the end 6. At that side of the plane 8 closest to the end 6, the passage 1a is widened so as to form the cylindrical extension or chamber 1b thereof. The extension 1b which has an inner surface configured to receive and position inserts, has a length or depth which is equal to the distance between the plane 8 and that end of the shank 1 nearest the end 6.

In the illustrated embodiment, the body section or rim 5 and shank 1 of the body 1,5 are discrete and are respectively provided with threads 7 so as to permit these to become engaged by screwing. In use, the rim 5 is pressed against the lips of a user.

An insert member or insert 3 is received in the body 1,5. The insert 3 is removable from the body 1,5 so as to allow it to be interchanged with a different insert or with a fresh identical insert. The insert 3 includes a substantially cylindrical centering portion or shank 3b which is accommodated with close tolerance in the extension 1b. The extension 1b and shank 3b define complementary or cooperating portions which serve to center the insert 3 in the body 1,5. The shank 3b has a length, as measured in axial direction of the body 1,5, which is greater than that of the extension 1b, as a result of which, and the close fit of the shank 3b in the extension 1b, it will always be possible to obtain a smooth transition between the second passage 3a provided in the insert 3 and the passage 1a in the shank 1 regardless of the diameter of the passage 3a. In other words, regardless of the diameter of the passage 3a, it will always be possible to place the insert 3 in the body 1,5 in such a manner that the inner surface of the insert 3 defining the passage 3a blends smoothly into the inner surface of the shank 1 defining the passage 1a. As seen here, the insert 3 is substantially tubular and is spaced from the end 6 of the body 1,5. The insert 3 also includes a substantially cylindrical extension 3c which projects beyond the end 9 of the mid-portion 3g thereof in a direction towards the end 6 of the body 1,5. The extension 3c may be laterally spaced from the mid-portion 3g via an intermediate flange 3d surrounding the mid-portion 3g, if desired, or via a ring-shaped channel 3e. Furthermore, the extension 3c need not be circumferentially continuous but may be provided with cut-outs at spaced locations circumferentially thereof so as to form a plurality of slots extending along the elongation of the body 1,5. When this is done, the extension 3c will be divided into a plurality of members extending along the elongation of the body 1,5, these members being elastically yieldable. The advantage of this will become apparent presently.

A substantially annular insert member or insert 4 is interposed between the insert 3 and the end 6 of the body 1,5, that is, between the end 9 of the mid-portion 3g and the end 6. The insert 4 is also removable from the body 1,5 so as to allow it to be interchanged with a different insert or with a fresh identical insert. The insert 4 is provided with a centering portion or shank 4b which fits into the extension 3c of the insert 3 with close tolerance. The insert 4 is precisely centered relative to the insert 3 and the body 1,5 by the insert 3, that is, the shank 4b and the extension 3c define complementary or cooperating portions which serve to center the insert 4. The length of the shank 4b is greater than that of the extension 3c, i.e., the length of the shank 4b is greater than the distance from the end 9 of the mid-portion 3g to that end of the extension 3c nearest the end 6 of the body 1,5. That surface or face of the insert 4 remote from the end 6 of the body 1,5 lies flush against the adjacent surface or face of the mid-portion 3g so that no air gaps are formed therebetween. The transition from the third passage 4a provided in the insert 4 to the passage 3a of the insert 3 is smooth or, in other words, the inner surface of the insert 4 defining the passage 4a blends smoothly into the inner surface of the insert 3 defining the passage 3a without discontinuity. It is advantageous when the extension 3c is divided into a plurality of elastically yieldable members as explained above since this permits the shank 4b to be subjected to a small stress as a result of which the insert 4 will be securely held in place. The peripheral portion or periphery of the insert 4 closest to the end 6 of the body 1,5 has a surface 4c which abuts the inner surface portion or inner surface 5a of the rim 5. Both of the surfaces 4c and 5a diverge in a direction away from the end 6 of the body 1,5 and may advantageously be either substantially conical or substantially spherical. The surfaces 4c and 5a cooperate or are complementary and serve to center the insert 4 in the body 1,5. The complementary nature of the surfaces 4c and 5a allows the insert 4 to be located particularly close to the open end of the rim 5 through which a user blows air into the mouthpiece without, however, at the same time forming discontinuities which affect the function of the mouthpiece. Also, in addition to the good centering effect afforded by the complementary surfaces 4c and 5a, a good seal is obtained between these abutting surfaces.

The insert 4 is so formed that the inner diameter of the passage 4a is substantially identical to the inner diameter of the passage 3a of the insert 3 at the abutting faces of the inserts 3 and 4 regardless of the diameters, depths, i.e. axial lengths, or shapes of the respective inserts 3 and 4. In other words, the inner diameter of the passage 4a at that face of the insert 4 which abuts the insert 3 is substantially identical for all inserts 4 to be used with the mouthpiece whereas the inner diameter of the passage 3a at that face of the insert 3 which abuts the insert 4 is substantially identical for all inserts 3 to be used with the mouthpiece. In turn, the so-defined inner diameter of the respective passages 3a and 4a are substantially equal to each other. As a result, any of the inserts 4 for the mouthpiece may be used together with any of the inserts 3 for the mouthpiece. It is also seen that the inserts 3 and 4 may be engaged so as to form a unit prior to insertion into the body 1,5. This allows the inserts 3 and 4 to be conveniently inserted into the body 1,5 as well as simplifying removal of the inserts 3 and 4 therefrom.

Figure 2:
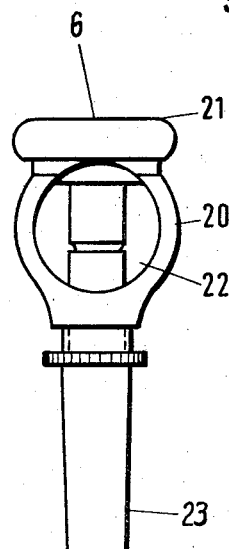
FIG. 2 is a side elevational view of a modified form of a mouthpiece according to the invention.
Figure 3:
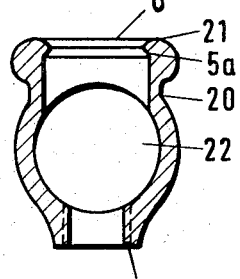
FIG. 3 is an axial sectional view of the upper portion of the mouthpiece of FIG. 2.
Figure 4:
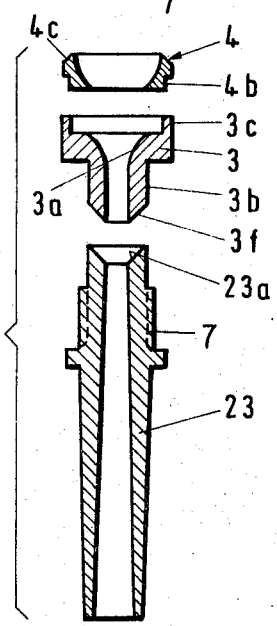
FIG. 4 is an exploded view showing some of the component parts of a mouthpiece according to the invention in axial section.

In the embodiment of FIG. 2, the mouthpiece includes an elongated substantially tubular composite body member or body 20,23, Here, the rim, indicated at 21, is integral with the body section or head 20 of the body 20,23. The head 20 is provided with two aligned lateral openings 22 at either side thereof. The openings 22 communicate with the interior of the body 20,23 so that the assembled inserts 3 and 4 may be inserted into and removed from the body 20,23 therethrough. As may be seen most clearly in FIGS. 3 and 4, the periphery of the insert 4 nearest the end 6 of the body 20,23 is again provided with a conical or spherical surface 4c which cooperates with or is complementary with the inner surface 5a of the rim 21. It is also seen that the shank 23 and head 20 are provided with mating threads 7 for assembly thereof. However, in contrast to the embodiment of FIG. 1, that end of the shank 3b of the insert 3 remote from the end 6 of the body 20,23 is provided with a surface 3f which diverges in a direction towards the end 6. Furthermore, the end of the shank 23 closest to the end 6 is also provided with a surface 23a which diverges in a direction towards the end 6. The surfaces 3f and 23a define cooperating or complementary portions which serve to center the insert 3. The surfaces 3f and 23a are advantageously conical or spherical and, in fact, if desired, the entire shank 3b may have a conical configuration. The shank 23 and head 20 are relatively displaceable in axial direction of the body 20,23 and, by virtue of the lateral openings 22, need not necessarily be completely disengaged in order to remove the inserts 3 and 4 from the body 20,23 or to insert these therein.

Figure 5:
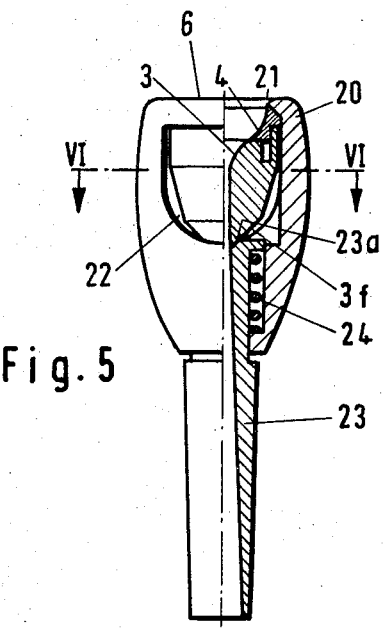
FIG. 5 is a partly side elevational and partly axial sectional view of another form of a mouthpiece according to the invention.

The embodiment of FIG. 5 is very similar to that of FIG. 2, the difference being that in this case the head 20 and shank 23 are not engaged by threads. Rather, a biasing member or spring 24, e.g. a spiral, coil or helical spring, is provided and reacts against both the head 20 and the shank 23. The forces exerted on the head 20 and the shank 23 by the spring 24 are oppositely directed and in axial direction of the body 20,23 so that the spring 24 urges the head 20 and the shank 23 into firm engagement. Any relative displacements of the head 20 and the shank 23 in axial direction of the body 20,23 will, therefore, occur against the action of the spring 24. In both the embodiments of FIG. 2 and FIG. 5, there exists equally the possibility of tightening the body 20,23, subsequent to insertion of the inserts 3 and 4 therein through the openings 22, so as to obtain a firm abutment between the complementary surfaces 3f and 23a and between the complementary surfaces 4c and 5a.

Figure 6:
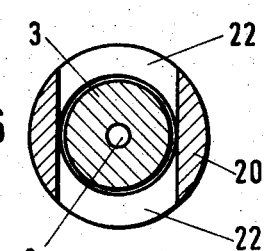
FIG. 6 is a cross-section as seen in the direction of arrows from the line VI—VI of FIG. 5.

FIG. 6 is a section taken in the plane VI—VI of FIG. 5. This Figure illustrates more clearly the arrangement of some of the components of the mouthpiece of FIG. 5.

Figure 7:
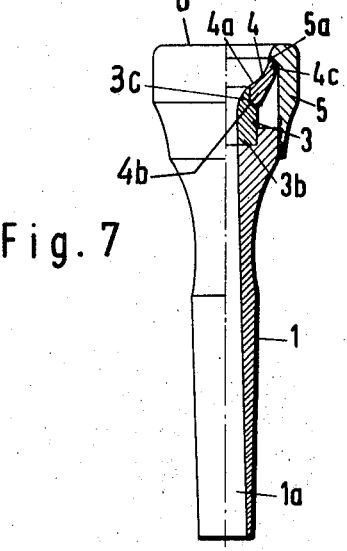
FIG. 7 is a partly side elevational and partly axial sectional view of still another form of a mouthpiece according to the invention.

The embodiment of FIG. 7 is similar to that of FIG. 1. However, in contrast to FIG. 1, wherein the shank 4b of the insert 4 is accommodated within the extension 3c of the insert 3, the extension 3c is here accommodated within the shank 4b with close tolerance.

It is seen that the invention has achieved all of the objectives set forth above. As a result of the configuration of the surface 4c of the insert 4 and that of the complementary surface 5a of the body 1,5 or 20,23, there is not only obtained a good seal between these surfaces but there is the added advantage that the passage 4a of the insert 4 may be located very close to the end 6 of the body 1,5 or 20,23 through which a user blows into the mouthpiece. Furthermore, this may be accomplished without in any way sacrificing the secure engagement of the insert 4 in the body 1,5 or 20,23. The relative centering of the inserts 3 and 4 may be obtained in one of two ways: either the shank 4b of the insert 4 may be firmly secured within the extension 3c of the insert 3, or, conversely, the extension 3c may be firmly secured within the shank 4b. In either case, it is particularly advantageous when the inserts 3 and 4 are assembled as a unit so that they may be easily inserted in or removed from the body 1,5 or 20,23 together.

The fact that the shank 4b of the insert 4 has a length greater that that of the extension 3c of the insert 3 also provides several advantages. First of all, the sealing action between the adjacent abutting faces of the inserts 3 and 4 is thereby improved. In addition, a ring-shaped gap, identified by reference numeral 10 in FIG. 1, is thus formed between the inserts 3 and 4 at the outer sides thereof so that the assembled inserts 3 and 4 may be readily separated. Also, in the region of transition between the passage 4a of the insert 4 and the passage 3a of the insert 3, the adjacent faces of the inserts 3 and 4 sealingly abut over a relatively small ring-shaped area and good sealing is obtained. A clamping action between the inserts 3 and 4 is obtainable by providing the extension 3c of the insert 3 with a plurality of slots extending in axial direction of the body 1,5 or 20,23 so that the extension 3c is divided into a plurality of elastically yieldable members.

In the case where the rim is, in itself, a discrete body section which is adapted to engage the shank via threads, as in the embodiments of FIGS. 1 and 7 where the rim 5 engages the shank 1 by means of threads 7, it is advantageous for the insert 3 to be provided with a shank 3b facing away from the end 6 of the body 1,5, with the shank 3b being accommodated in the extension 1b of the passage 1a for centering the insert 3. Here, it is favorable when the length of the shank 3b is greater than that of the extension 1b since this allows the insert 3 to be easily removed from the body 1,5. Furthermore, this also leads to improved centering of the insert 3 and to an improved sealing action between the adjacent abutting faces of the insert 3 and the shank 1 which need abut over a relatively small area only.

In another advantageous modification of the invention, it is, however, also possible to construct the body of the mouthpiece in such a manner that the rim itself is not a discrete body section engageable to the shank via threads. In accordance with the invention, this modification, which corresponds to the embodiments of FIGS. 2-6, has the rim 21 formed integral with the head 20 of the body 20,23. At least one lateral opening 22 is provided in the body 20,23 through which the inserts 3 and 4 may be removed from the body 20,23 and inserted therein without difficulty. It is particularly advantageous in this regard when two openings 22 are provided which are located opposite each other at opposed sides of the body 20,23.

In order to enable the inserts 3 and 4 to be firmly secured in the body of the mouthpiece it is also favorable, especially for the latter modification, when the mouthpiece is so constructed that the shank 23 and the head 20 become engaged by moving these relative to each other in axial direction of the body 20,23. Advantageously, that end of the insert 3 remote from the end 6 of the body 20,23 is provided with a conical or spherical surface 3f whereas that end of the shank 23 closest to the end 6 is provided with a complementary surface 23a, these surfaces cooperating to center the insert 3. Also, the shank 23 and the head 20 may be provided with mating threads 7 for engagement or, on the other hand, the need for such threads may be eliminated by providing a spring 24 for urging the shank 23 and the head 20 into firm engagement so that any relative axial movements thereof are against the action of the spring 24.

In all embodiments, greater flexibility as regards interchange of one insert for another is attained by having the inner diameter of the passage 4a at that face of the insert 4 which abuts the insert 3 be substantially identical for all inserts 4 to be used with the mouthpiece while having the inner diameter of the passage 3a at that face of the insert 3 which abuts the insert 4 be substantially equal to this inner diameter of the passage 4a for all inserts 3 to be used with the mouthpiece. In accordance with the invention, this is true regardless of the diameters, shapes, depths or axial lengths of the respective inserts 3 and 4.

The individual inserts 3, as well as the individual inserts 4, may respectively be made up in sets wherein each member is slightly different from the next so that different effects may be produced. Since the inserts 3 and 4 may be assembled as a unit, it is possible, by having the difference between any one member in the set and the next respective member be small, to produce any desired variations in effects without difficulty by merely combining the inserts 3 and 4 as required, which is one of the many advantages of the invention. Also, the person blowing the instrument, e.g. a brass wind instrument such as a trumpet, horn, trombone or the like, is able to interchange the assembled inserts 3 and 4 even during a performance. Furthermore, by appropriately marking the respective inserts 3 and 4, the person blowing the instrument is enabled to be continuously cognizant of the dimensions of the passages 3a and 4a of the respective inserts 3 and 4 which are to be used. The wide range of variations obtainable by having the difference between any one member in a set and the next respective member be small helps the person blowing the instrument to increase his self-confidence and virtuosity. As a result of the many combinations which are cheaply available, the person blowing the instrument is readily able to systematically examine the mouthpiece and thereby improve his performance. The tolerances between the various cooperating portions which serve to center the inserts 3 and 4 may be very small without, at the same time, increasing the difficulty of interchanging the inserts 3 and 4. In addition, the oxidation which adversely influences the function of the mouthpiece is simply and dependably eliminated as a result of the tight seal between the various abutting surfaces.

It will be understood that each of the elements described above, or two or more together, may also find a useful application in other types of constructions differing from the types described above.

While the invention has been illustrated and described as embodied in the mouthpiece for wind instruments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended

1. A mouthpiece for wind instruments, comprising an elongated substantially tubular composite body member having an end adapted to be pressed against the lips of a user, said body member including in the region of said end an inner surface which diverges in a direction away from said end, a first substantially tubular insert member removably accommodated in said body member and spaced from said end; and a second substantially annular insert member interposed between said first insert member and said end and being centered by said first insert member, said second insert member having a complementary surface which sealingly abuts said inner surface, and said body member being provided with at least one lateral opening communicating with the interior thereof so as to permit insertion and removal of said first and second insert members.

2. A mouthpiece for brass wind instruments, comprising an elongated substantially tubular composite body member having an external end adapted to be pressed against the lips of a user and an opposite end adapted to be connected with one of said instruments, the interior of said body member including an inner surface which diverges in a direction away from said external end, a chamber having an inner surface configurated to receive and position inserts, and a first passage extending through said opposite end for passing vibrations from said user's lips into said one instrument; a first substantially tubular insert member having a second passage therethrough, said first insert member being inserted into said chamber and centered thereby, effecting smooth mating of said second passage and said first passage; and a second substantially annular insert member having a third passage therethrough and a centering portion complementary to a portion of said first insert member, said second insert member being interposed between said first insert member and said external end and being centered by said first insert member and effecting smooth mating of said third passage and said second passage, and said second insert member having a surface complementary with said body member inner surface and which sealingly abuts said body member inner surface.

3. A mouthpiece as defined in claim 2, wherein said complementary surfaces of said body member and said second insert member are substantially conical.

4. A mouthpiece as defined in claim 2, wherein said complementary surfaces of said body member and said second insert member are substantially spherical.

5. A mouthpiece as defined in claim 2, wherein said portion of said first insert member receives said centering portion, said centering portion having a length greater than that of said portion of said first insert member.

6. A mouthpiece as defined in claim 5, wherein said portion of said first insert member comprises a plurality of elastically yieldable members extending along the elongation of said body member for firmly securing said centering portion.

7. A mouthpiece as defined in claim 2, wherein said first insert member comprises a centering portion received by said chamber, the length of said centering portion of said first insert member being greater than that of said chamber.

8. A mouthpiece as defined in claim 2, wherein said body member comprises two discrete body sections each of which is provided with a flange portion extending in substantially radial direction of said body member, said flange portions being spaced from one another in axial direction of said body member and at least in part overlyng one another, said flange portions and said body sections together defining a space intermediate the latter; and further comprising biasing means in said space bearing against said flange portions and biasing said body sections relative to each other in axial direction of said body member to thereby urge said complementary surfaces of said body member and said second insert member, and said first and second insert members, into firm engagement.

9. A mouthpiece as defined in claim 2, wherein said portion of said first insert member is integral therewith.

10. A mouthpiece as defined in claim 2, wherein said body member comprises two discrete body sections adapted to become engaged when moved relative to each other in axial direction of said body member.

11. A mouthpiece as defined in claim 10, wherein said external end comprises a rim adapted to be pressed against the lips of a user, said rim being integral with one of said body sections.

12. A mouthpiece as defined in claim 10, wherein said first insert member has a substantially concial surface facing away from said external end, one of said body sections having a substantially conical complementary surface abutting said conical surface of said first insert member for centering said first insert member.

13. A mouthpiece as defined in claim 10, wherein said first insert member has a substantially spherical surface facing away from said external end, one of said body sections having a substantially spherical complementary surface abutting said spherical surface of said first insert member for centering said first insert member.

14. A mouthpiece as defined in claim 10, wherein said body sections are provided with mating threads for engagement thereof.

15. A mouthpiece as defined in claim 10; and further comprising means for biasing said body sections relative to each other in the axial direction of said body member to thereby urge said complementary surfaces of said body member and said second insert member, and said first and second insert members, into firm engagement.

16. A mouthpiece as defined in claim 2, wherein said first insert member has a face remote from said external end and abutting an adjacent face of said second insert member, said first insert member being interchangeable with other first insert members and said second insert member being interchangeable with other second insert members, the passages of all of said first and second insert members at said faces being substantially identical.

* * * * *